United States Patent Office 2,866,789
Patented Dec. 30, 1958

2,866,789

INHIBITION OF POPCORN POLYMERIZATION OF VINYLPYRIDINES

Clyde W. Mertz, Borger, Tex., assignor to Phillips Petroleum Company, a corporation of Delaware No Drawing. Application May 22, 1953
Serial No. 356,869

17 Claims. (Cl. 260—290)

This invention relates to a process for inhibiting proliferous type polymerization of polymerizable heterocyclic compounds having a hetero nitrogen atom. In one of its aspects, this invention relates to the inhibiting of proliferous polymerization of vinyl-substituted heterocyclic nitrogen compounds. In a further aspect this invention relates to the inhibiting of the formation of proliferous type polymers in vinylpyridine compounds.

The words inhibit and stabilize as used in this specification and the claims appended thereto are used to means that the formation of popcorn polymer is materially reduced or prevented and do not imply any mechanism for accomplishing this purpose.

In the processing of 2-methyl-5-vinylpyridine, vinylpyridine, vinyl-substituted heterocyclic nitrogen compounds, and other alkene, alkadiene and alkyne substituted heterocyclic nitrogen compounds by various means, including distillation, polymerization occurs which manifests itself in two ways. Soluble polymers are formed which are evidenced by an increase in viscosity, and ultimately, by forming a solid mass. Also formed are insoluble polymers or proliferous polymers referred to in the trade and herein as popcorn polymers. The popcorn polymer is insoluble in the heterocyclic nitrogen compound and in other organic compounds, and when in contact with a monomer, it continues to grow. This problem is particularly acute in the manufacture and processing of vinyl-substituted pyridines obtained by the dehydrogenation of the corresponding ethyl substituted pyridines. Popcorn polymer accumulates or grows very rapidly in distillation processes, resulting in the loss of valuable material and causing pipes, condensers, and equipment to be clogged.

When 2-methyl-5-vinylpyridine (MVP) is made from 2-methyl-5-ethylpyridine (MEP) by dehydrogenation, the resulting mixture contains, besides the major constituents MVP and MEP, small amounts of picolines, divinylpyridines, and some unidentified materials probably other diolefin substituted pyridines which initiate the proliferous type polymerization known to the art as popcorn polymer.

In accordance with this invention, for the purpose of overcoming difficulties due to proliferous polymer formation tendencies of these heterocyclic nitrogen compounds, it is proposed to add a novel inhibiting agent. I have discovered that readily polymerizable heterocyclic nitrogen compounds can be effectively inhibited from the formation of popcorn type polymerization during fractionation and storage by adding an organic nitro compound selected from the group of compounds represented by $$NO_2—R—NH—R'$$

wherein R represents phenylene or an alkyl substituted phenylene and R' represents alkyl, phenyl, alkyl substituted phenyl or hydrogen and said compound will for the purpose of this specification and the claims be designated as a nitrophenylamine. Among the nitrogen organic compounds which are useful in the practice of my invention are ortho, meta and para-nitroaniline, ortho, meta and para-nitrodiethylaniline, ortho, meta and para-nitrodimethylaniline, ortho, meta and para-nitrodiphenylamine, nitro-4'-methyldiphenylamine, ortho, meta and para-nitrotoludiene, ortho, meta and para-nitroxylidiene, 3 - nitro-o-toludiene, 4 - nitro-o-toludiene, 5 - nitro-o-toludiene, 6-nitro-o-toludiene, 2-nitro-m-toludiene, 6-nitro-m-toludiene, 2-nitro-p-toludiene, 3-nitro-p-toludiene, 2-nitrodiphenylamine, 3-nitro-diphenylamine, 4-nitro-diphenylamine, 3-nitro-3'-methyl-diphenylamine, 4-nitro-4'-methyl-diphenylamine, 2-nitro-3'-methyl-diphenylamine, 3-nitro-4'-methyl-diphenylamine, 4-nitro-2'-methyl-diphenylamine and like compounds.

The polymerization which is inhibited by the novel stabilizing agents disclosed herein is primarily that which forms an insoluble, hard, porous and opaque material often referred to as popcorn polymer. However, polymers are also formed which are soluble in the heterocyclic nitrogen reactants and which become apparent by an increase in viscosity. As is seen from the examples, soluble polymer formation is also inhibited by the disclosed nitrophenylamine compounds.

One group of polymerizable heterocyclic nitrogen compounds which can be inhibited in accordance with my invention is the mono- and divinylpyridines, with the vinyl group being present in any of the several positions in the pyridine ring. Alkyl groups can be present on the ring, or on the alpha carbon atom of the vinyl group, but the number of carbon atoms in the combined alkyl groups should generally not be greater than 12. These alkyl groups are preferably methyl and ethyl groups. Substituents attached to carbon atoms in the ring can be selected from the group consisting of hydrogen, alkyl, vinyl, and isopropenyl (alpha-methylvinyl) groups; at least one and not more than two of said groups being vinyl or alpha-methylvinyl; and the total number of carbon atoms in the alkyl groups being not greater than 12. Examples of such compounds are 2-vinylpyridine; 3-vinylpyridine, 4-vinylpyridine, trimethyl-5-vinylpyridine; 3,4,5,6 - tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 3-dodecyl - 4,5 - divinylpyridine; 2,4-dimethyl-5,6-diphenyl-3-vinylpyridine; 2-decyl-5-(alpha-methylvinyl) pyridine; 3,5-di (alpha-methylvinyl) pyridine; similar mono and di substituted alkene, alkadiene, and alkyne pyridines.

Other polymerizable heterocyclic compounds containing a hetero nitrogen atom included within the scope of this invention are those vinyl and alpha-methyl-vinyl substituted heterocyclic nitrogen compounds in which the ring structure is unsaturated, partially saturated, and completely saturated. Examples include alkene, alkadiene, and alkyne substituted quinolines, iso-quinolines, piperidines (hexahydropyridines), pyrroles, pyrrolidines, pyrrolidones alkyl derivatives of the foregoing compounds, dihydro and tetrahydropyridines, partially hydrogenated quinolines, isoquinolines, and pyrrolines (dihydropyrrols). Of especial importance are the vinyl and alpha-methylvinyl substituents of these heterocyclic nitrogen compounds examples of which are 2-vinylquinolines; 8-ethyl-2-vinylquinolines; 4-hexyl-5-vinylquinoline; 1-vinylisoquinoline; 5-methyl-1-isopropenylisoquinoline; 1,8-divinylisoquinoline; vinylpyrrolidone; vinyl-pyrrole; vinylpiperidine; and vinylpyrrolidine and the like. Normally the alkene, alkadiene or alkyne substituents will be attached to a ring carbon atom. However, in compounds wherein the ring nitrogen atom is a secondary nitrogen atom, the vinyl group can be attached to this ring nitrogen atom, for example N-vinylcarbazole and N-vinylpyrrolidone. The process of this invention is particularly applicable to organic or hydrocarbon mixtures containing a substantial proportion of a vinylpyridine compound, Examples of vinylpyridine compounds contained in such mixtures are 2-vinyl-4,6-dimethylpyridine, 2-methyl-4-vinylpyridine, 2-methyl-5-vinylpyridine, 5-ethyl-2-vinylpyridine, 5-amyl-2-vinylpyridine. The heterocyclic compound containing a hetero nitrogen atom of particular commercial importance at the present time is 2-methyl-5-vinylpyridine (MVP).

In carrying out the invention, solution of the inhibiting agent in the heterocyclic nitrogen compound can be accomplished in any suitable manner. The concentration of the nitrophenylamine to be used will depend upon numerous factors such as temperature, time, and economic considerations. In practice a range of concentrations of from 0.01 percent to 5.0 percent by weight of the nitrophenylamine will be employed, all percentages being based on the weight of the heterocyclic nitrogen compound being inhibited. Also, the amount will depend on the particular heterocyclic nitrogen compound concerned, and/or as will be apparent from the following examples, upon the particular nitrophenylamine being utilized.

*Example I*

A mixture comprising approximately 95 weight percent of 2-methyl-5-vinylpyridine, and the balance being comprised of 2-methyl-5-ethylpyridine, divinylpyridine, dimethylpyridine, picolines, and the like as obtained from a dehydrogenation plant was vacuum flashed at less than 50 mm. mercury pressure and at 200° F. in a laboratory distillation column. The bottoms product containing a large percentage of divinylpyridine was recovered for use as a polymer initiator.

Approximately one percent, based on the weight of the monomer mixture being initiated, of the bottoms product from the laboratory still was added to a portion of the 95 percent MVP material along with a small seed of popcorn polymer. The seeded mixture was stored at 190° F. for a period of 12 days with the results as shown in the table below.

Unless the bottoms product is used as an initiator, the behavior of the seeded product was unpredictable, it taking 24 to 48 hours or longer for the complete formation of popcorn polymer. In every case where the initiator material was added, the seeded monomer was completely converted to popcorn polymer in less than 10 hours.

| Material | Observation |
|---|---|
| (1) Control comprised of 95% MVP material plus 1% still bottoms and a popcorn seed. | All popcorn in less than 10 hours. |
| (2) (1) plus 0.2 wt. percent p-nitroaniline. | Very viscous; no popcorn polymer in 10 days. |
| (3) (1) plus 0.5 wt. percent p-nitroaniline. | Do. |
| (4) (1) plus 1.0 wt. percent nitroaniline. | Slightly viscous, no popcorn polymer in 10 days. |
| (5) (1) plus 0.2 wt. percent 2-nitrodiphenylamine. | Slightly viscous in 8 days, no popcorn polymer in 11 days. |

From the foregoing, it is apparent that nitrophenylamines are effective inhibitors of popcorn, or proliferous polymer, formation when heterocyclic compounds having a hetero nitrogen atom are maintained at elevated temperature, and most remarkably, even when the test solutions are seeded to make the test conditions more severe.

This invention accordingly concerns a method for treating polymerizable heterocyclic nitrogen compounds with nitrophenylamine up to 400° F. as well as at room temperatures or below. In accordance with this invention organic mixtures containing polymerizable heterocyclic nitrogen compounds mixed with other heterocyclic nitrogen compounds, or purified polymerizable heterocyclic nitrogen compounds, can be stored over long periods of time preferably at room temperature. Also, when it is desired to separate a particular heterocyclic nitrogen compound from other organic compounds, the inhibited solution can be distilled, preferably at reduced pressure, without any substantial loss of product, the nitrophenylamine serving to inhibit polymerization during the process. The instant invention is particularly applicable to mixtures of heterocyclic compounds having a hetero nitrogen atom, containing a susbtantial proportion of at least one vinyl-substituted heterocyclic compound having a hetero nitrogen atom, i. e., sufficient to cause difficulty due to polymer formation during storage and distillation.

In the practice of this invention the polymer formation inhibiting agents disclosed herein can be used, for example, in the following manner. In the preparation of 2-methyl-5-vinylpyridine from 2-methyl-5-ethylpyridine by dehydrogenation, the principal separation is a combined steam and vacuum distillation to make a separation between the MVP and the MEP. Because this is a difficult separation, due to the proximity of the boiling points of the stated components, considerable polymerization of the MVP occurs, and consequently, after a short period of time, operation of the column becomes impossible due to insoluble polymer formation in the lower part of the fractionation column and in the kettle. However, by the use of a nitrophenylamine in accordance with this invention, shut-downs due to the formation of insoluble polymers can be largely eliminated. The nitrophenylamine can be added directly to the feed of the distillation column or it may be added to the reflux of said column or a combination of the two. The amount of the nitrophenylamine to be used may vary from 0.01 to 5.0 percent and generally from 0.05 to 5.0 percent by weight based on the weight of the heterocyclic nitrogen compound. I prefer to use between 0.5 and 1.0 percent inhibitor.

It will be understood that the foregoing disclosure is by way of illustration only and that other embodiments within the scope of the invention will occur to those skilled in the art. Those in the art will appreciate, for instance, that for the purpose of this invention, alkene, alkadiene, and alkyne substituted heterocyclic compounds having a hetero nitrogen atom further substituted with non-interfering groups, for example, halo-, nitro-, amino-, hydroxyl-, and carboxyl-, are the same as alkene, alkadiene, and alkyne heterocyclic nitrogen compounds not further substituted.

I claim:

1. A method which comprises stabilizing against proliferous polymerization during fractionation and storage a compound selected from the group consisting of monovinylpyridine and alkyl substituted monovinylpyridines wherein the total carbon atoms in alkyl substituents does not exceed 12, by treating said compound with inhibiting amounts of an organic compound of the general formula

wherein R is selected from the group consisting of phenylene and alkyl substituted phenylene and wherein R' is selected from the group consisting of alkyl, phenyl, alkyl substituted phenyl and hydrogen.

2. A method which comprises dissolving inhibiting amounts of a nitrophenylamine of the general formula

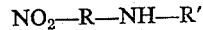

wherein R is selected from the group consisting of phenylene and alkyl substituted phenylene and wherein R' is selected from the group consisting of alkyl, phenyl, alkyl substituted phenyl and hydrogen into a proliferous polymerizable compound selected from the group of compounds consisting of monovinylpyridine and alkyl substituted monovinylpyridines wherein the total carbon atoms in alkyl substituents does not exceed 12, and thereafter fractionating the solution to recover the polymerizable compound in a readily polymerizable form.

3. The method of claim 2 wherein the nitrophenylamine is dissolved in an amount to provide a solution of nitrophenylamine in the range of 0.01 and 5.0 weight percent based on the weight of the polymerizable compound.

4. A continuous process for inhibiting the formation of proliferous polymers in a distillation zone in which a compound is being separated by distillation said compound being selected from the group of compounds consisting of monovinylpyridine and alkyl substituted monovinylpyridines wherein the total carbon atoms in alkyl substituents does not exceed 12, which process comprises introducing into the still feed from 0.05 percent to 5.0 percent by weight, based on the compound of the above general formula, of a nitrophenylamine of the formula $$NO_2—R—NH—R'$$

where R is selected from the group consisting of phenylene and alkyl substituted phenylene and R' is selected from the group consisting of alkyl, phenyl, alkyl substituted phenyl and hydrogen and effecting said distillation in the presence of said nitrophenylamine.

5. The process of claim 4 wherein the compound being separated is 2-methyl-5-vinylpyridine.

6. A process for inhibiting the formation of proliferous polymers in a mixture of organic compounds, said organic compounds being comprised of 2-methyl-5-vinylpyridine, divinylpyridine, and 2-methyl-5-ethylpyridine, which said process comprises adding to said mixture of organic compounds inhibiting amounts of a nitrophenylamine compound of the formula $$NO_2—R—NH—R'$$

wherein R is selected from the group consisting of phenylene and alkyl substituted phenylene and wherein R' is selected from the group consisting of alkyl, phenyl, alkyl substituted phenyl and hydrogen.

7. The process of claim 6 wherein the nitrophenylamine compound is nitroaniline.

8. A polymerizable heterocyclic nitrogen base selected from the group consisting of compounds consisting of monovinylpyridine and alkyl substituted monovinylpyridines wherein the total carbon atoms in alkyl substituents does not exceed 12, said heterocyclic nitrogen base being stabilized by the addition of a stabilizing amount of a nitrophenylamine having the formula $$NO_2—R—NH—R'$$

where R is selected from the group consisting of phenylene and alkyl substituted phenylene and R' is selected from the group consisting of alkyl, phenyl, alkyl substituted phenyl and hydrogen.

9. The composition of claim 8 wherein the amount of nitrophenylamine is in the range of from 0.05 and 5.0 weight percent based on the weight of the nitrogen base.

10. A composition of matter comprising a mixture of organic compounds, said mixture comprising 2-methyl-5-vinylpyridine, 5-ethyl-2-methylpyridine, and divinylpyridine, said mixture having incorporated therein 0.05 to 5.0 percent by weight based on the weight of the 2-methyl-5-vinylpyridine, a nitrophenylamine of the formula $$NO_2—R—NH—R'$$

wherein R is selected from the group consisting of phenylene and alkyl substituted phenylene and R' is selected from the group consisting of alkyl, phenyl, alkyl substituted phenyl and hydrogen.

11. The composition of claim 10 wherein the nitrophenylamine is nitroaniline.

12. The process of claim 6 wherein the nitrophenylamine is para-nitroaniline.

13. The process of claim 6 wherein the nitrophenylamine is nitrodiphenylamine.

14. The process of claim 6 wherein the nitrophenylamine is 2-nitrodiphenylamine.

15. The composition of claim 10 wherein the nitrophenylamine is para-nitroaniline.

16. The composition of claim 10 wherein the nitrophenylamine is nitrodiphenylamine.

17. The composition of claim 10 wherein the nitrophenylamine is 2-nitrodiphenylamine.

References Cited in the file of this patent

UNITED STATES PATENTS

| | | |
|---|---|---|
| 2,512,660 | Mahan | June 27, 1950 |
| 2,556,845 | Kauffman | June 12, 1951 |

OTHER REFERENCES

Schultz Makromol: Chem., vol. 1, pages 94–105 (1947).

Schultz et al.: Ber. Deut. Chem., vol. 80, pages 232–242 (1947).

Frank et al.: J. Am. Chem. Soc., vol. 68, page 908 (1946).

UNITED STATES PATENT OFFICE
CERTIFICATE OF CORRECTION

Patent No. 2,866,789                                              December 30, 1958

Clyde W. Mertz

It is hereby certified that error appears in the printed specification of the above numbered patent requiring correction and that the said Letters Patent should read as corrected below.

Column 6, list of references cited, under the heading UNITED STATES PATENTS, add the following reference:

2,592,625 Wagner--------April 15, 1952

Signed and sealed this 6th day of October 1959.

(SEAL)
Attest:

KARL H. AXLINE                                                  ROBERT C. WATSON
Attesting Officer                                            Commissioner of Patents